United States Patent
Jung

(10) Patent No.: US 9,197,070 B2
(45) Date of Patent: Nov. 24, 2015

(54) WIRELESS POWER TRANSMITTER USING A RESONANCE COIL VIA A RESONANCE FREQUENCY BAND AND CORRESPONDING METHOD

(71) Applicant: LG INNOTEK CO., LTD., Seoul (KR)

(72) Inventor: Woo Kil Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 186 days.

(21) Appl. No.: 13/673,163

(22) Filed: Nov. 9, 2012

(65) Prior Publication Data

US 2013/0119778 A1 May 16, 2013

(30) Foreign Application Priority Data

Nov. 10, 2011 (KR) .................. 10-2011-0117233

(51) Int. Cl.
*H04B 5/00* (2006.01)
*H02J 5/00* (2006.01)
*H01F 38/14* (2006.01)
*H02J 17/00* (2006.01)
*H02J 7/02* (2006.01)

(52) U.S. Cl.
CPC ............. *H02J 5/005* (2013.01); *H01F 38/14* (2013.01); *H02J 7/025* (2013.01); *H02J 17/00* (2013.01); *H04B 5/0037* (2013.01); *H04B 5/0087* (2013.01)

(58) Field of Classification Search
CPC .................................. H04B 5/00; H02J 17/00
USPC ........................................................ 307/104
See application file for complete search history.

(56) References Cited

U.S. PATENT DOCUMENTS

| | | | |
|---|---|---|---|
| 7,443,057 B2 | 10/2008 | Nunally | |
| 8,120,311 B2 | 2/2012 | Baarman et al. | |
| 2005/0068019 A1* | 3/2005 | Nakamura et al. | ............ 323/355 |
| 2005/0151511 A1 | 7/2005 | Chary | |
| 2008/0014897 A1 | 1/2008 | Cook et al. | |
| 2009/0096413 A1* | 4/2009 | Partovi et al. | ............ 320/108 |
| 2009/0108679 A1 | 4/2009 | Porwal | |
| 2009/0284369 A1* | 11/2009 | Toncich et al. | ............ 340/539.3 |
| 2010/0033021 A1 | 2/2010 | Bennett | |

(Continued)

FOREIGN PATENT DOCUMENTS

| | | |
|---|---|---|
| KR | 10-2010-0004599 A | 1/2010 |
| KR | 10-2010-0101470 A | 9/2010 |

(Continued)

OTHER PUBLICATIONS

European Search Report dated Mar. 15, 2013 in European Application No. 12191062.4.

(Continued)

*Primary Examiner* — Adi Amrany
(74) *Attorney, Agent, or Firm* — Birch, Stewart, Kolasch & Birch, LLP

(57) ABSTRACT

A wireless power transmission method of a wireless power transmitter for transmitting power to a wireless power receiver according to the embodiment includes transmitting a connection signal for identifying the wireless power receiver, identifying the wireless power receiver by receiving a response signal to the connection signal from the wireless power receiver, negotiating a power transmission condition with the identified wireless power receiver and transmitting the power to the identified wireless power receiver according to the negotiated power transmission condition.

9 Claims, 6 Drawing Sheets

(56) References Cited

U.S. PATENT DOCUMENTS

| | | |
|---|---|---|
| 2010/0079005 A1 | 4/2010 | Hyde et al. |
| 2010/0181961 A1 | 7/2010 | Novak et al. |
| 2010/0253281 A1 | 10/2010 | Li |
| 2011/0127952 A1 | 6/2011 | Walley et al. |
| 2011/0127953 A1 | 6/2011 | Walley et al. |
| 2011/0127954 A1 | 6/2011 | Walley et al. |
| 2011/0244913 A1 | 10/2011 | Kim et al. |
| 2012/0104867 A1 | 5/2012 | Mudrick et al. |
| 2012/0112554 A1 | 5/2012 | Kim et al. |
| 2012/0146576 A1 | 6/2012 | Partovi |
| 2012/0161696 A1 | 6/2012 | Cook et al. |
| 2012/0242158 A1 | 9/2012 | Lee et al. |
| 2012/0280650 A1 | 11/2012 | Kim et al. |
| 2012/0313446 A1 | 12/2012 | Park et al. |
| 2013/0063082 A1 | 3/2013 | Lee et al. |
| 2013/0135105 A1 | 5/2013 | Man |
| 2014/0091641 A1 | 4/2014 | Ichikawa |

FOREIGN PATENT DOCUMENTS

| | | |
|---|---|---|
| KR | 10-2010-0122934 A | 11/2010 |
| TW | M390602 U1 | 10/2010 |
| TW | 201108550 A1 | 3/2011 |
| TW | M407452 U1 | 7/2011 |
| TW | M408868 U1 | 8/2011 |
| WO | WO-2009/050624 A2 | 4/2009 |
| WO | WO 2010/020895 A2 | 2/2010 |

OTHER PUBLICATIONS

European Search Report dated Feb. 13, 2015 in European Application No. 14189915.3.
U.S. Office Action dated Feb. 2, 2015 issued in copending U.S. Appl. No. 14/325,217.
US Office Action for copending U.S. Appl. No. 14/325,171 dated Jan. 30, 2015.

* cited by examiner

WIRELESS POWER TRANSMITTER USING A RESONANCE COIL VIA A RESONANCE FREQUENCY BAND AND CORRESPONDING METHOD

CROSS-REFERENCE TO RELATED APPLICATION

This application claims the benefit under 35 U.S.C. §119 of Korean Patent Application No. 10-2011-0117233, filed Nov. 10, 2011, which is hereby incorporated by reference in its entirety.

BACKGROUND

The embodiment relates to a wireless power transmitter, a wireless power receiver, a wireless power transmission method and a wireless power reception method. In more particular, the embodiment relates to a wireless power transmission for actively transmitting power according to power transmission state between a wireless power transmitter and a wireless power receiver.

A wireless power transmission or a wireless energy transfer refers to a technology for wirelessly transferring electric energy to desired devices. In the 1800's, an electric motor or a transformer employing the principle of electromagnetic induction has been extensively used and then a method for transmitting electric energy by irradiating electromagnetic waves, such as radio waves or lasers, has been suggested. Actually, electric toothbrushes or electric razors, which are frequently used in daily life, are charged based on the principle of electromagnetic induction. Until now, the long-distance transmission using the magnetic induction, the resonance and the short-wavelength radio frequency has been used as the wireless energy transfer scheme.

However, according to the related art, power transmission environment between a transmission side and a reception side cannot be actively recognized upon the wireless power transmission between the transmission side and the reception side. Thus, a bidirectional communication for sharing state information between the transmission side and the reception side is necessary to achieve more effective and active power transmission.

BRIEF SUMMARY

An embodiment provides a wireless power transmitter, a wireless power receiver, a wireless power transmission method and a wireless power reception method, capable of actively and effectively performing power transmission by transceiving information about the power transmission state between the wireless power transmitter and the wireless power receiver.

According to one embodiment, there is provided a wireless power transmission method of a wireless power transmitter for transmitting power to a wireless power receiver. The wireless power transmission method includes transmitting a connection signal for identifying the wireless power receiver, identifying the wireless power receiver by receiving a response signal to the connection signal from the wireless power receiver, negotiating a power transmission condition with the identified wireless power receiver and transmitting the power to the identified wireless power receiver according to the negotiated power transmission condition.

According to one embodiment, there is provided a wireless power reception method of a wireless power receiver for receiving power from a wireless power transmitter. The wireless power reception method includes receiving a connection signal for identifying the wireless power receiver, transmitting a response signal to the connection signal to the wireless power transmitter, negotiating a power transmission condition with the wireless transmitter and receiving the power from the wireless power transmitter according to the negotiated power transmission condition.

According to one embodiment, there is provided a wireless power transmitter for transmitting power to a wireless power receiver, the wireless power transmitter including a transmitting unit to transmit a connection signal for identifying the wireless power receiver, an identifying unit to identify the wireless power receiver by receiving a response signal to the connection signal and a negotiating unit to negotiate a power transmission condition with the identified wireless power receiver, wherein the wireless power transmitter transmits the power to the identified wireless power receiver according to the negotiated power transmission condition.

According to one embodiment, there is provided a wireless power receiver for receiving power from a wireless power transmitter, the wireless power receiver including a receiving unit to receive a connection signal for identifying the wireless power receiver, a transmitting unit to transmit a response signal to the connection signal to the wireless power transmitter and a negotiating unit to negotiate a power transmission condition with the wireless transmitter, wherein the wireless power receiver receives the power from the wireless power transmitter according to the negotiated power transmission condition.

According to one embodiment, the power transmission can be actively and effectively achieved by using state information between the wireless power transmitter and the wireless power receiver.

DETAILED DESCRIPTION

Figure 1:
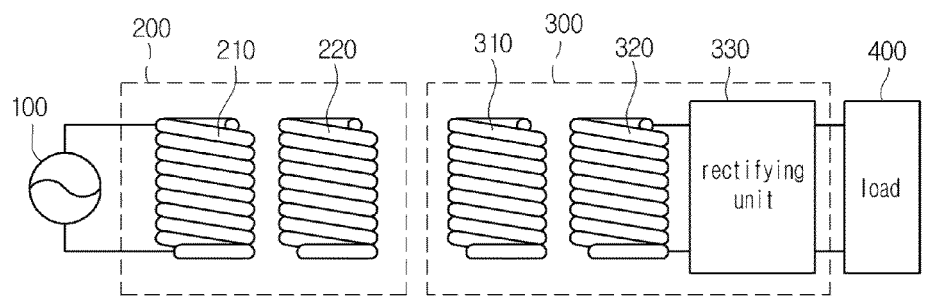
FIG. 1 is a view showing a wireless power transmission system according to one embodiment.

FIG. 1 is a view showing a wireless power transmission system according to one embodiment.

Referring to FIG. 1, the wireless power transmission system may include a power supply apparatus 100, a wireless power transmitter 200, a wireless power receiver 300, and a load 400.

According to one embodiment, the power supply apparatus 100 may be included in the wireless power transmitter 200.

The wireless power transmitter 200 may include a transmission induction coil 210 and a transmission resonant coil 220.

The wireless power receiver 300 may include a reception resonant coil 310, a reception induction coil 320 and a rectifying unit 330.

Both terminals of the power supply apparatus 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying unit 330, and the load 400 is connected to both terminals of the rectifying unit 330. According to one embodiment, the load 400 may be included in the wireless power receiver 300.

The power generated from the power supply apparatus 100 is transmitted to the wireless power transmitter 200. The power received in the wireless power transmitter 200 is transmitted to the wireless power receiver 300, that is, has the resonance frequency the same as that of the wireless power transmitter 200, through a resonance phenomenon.

Hereinafter, the power transmission process will be described in more detail.

The power supply apparatus 100 generates AC power having a predetermined frequency and transmits the AC power to the wireless power transmitter 200.

The transmission induction coil 210 and the transmission resonant coil 220 are inductively coupled with each other. In other words, if AC current flows through the transmission induction coil 210 due to the power received from the power supply apparatus 100, the AC current is induced to the transmission resonant coil 220 physically spaced apart from the transmission induction coil 210 due to the electromagnetic induction.

Thereafter, the power received in the transmission resonant coil 220 is transmitted to the wireless power receiver 300, which makes a resonance circuit with the wireless power transmitter 200, using resonance.

Power can be transmitted between two LC circuits, which are impedance-matched with each other, using resonance. The power transmitted using the resonance can be farther transmitted with higher efficiency when comparing with the power transmitted by the electromagnetic induction.

The reception resonant coil 310 receives power from the transmission resonant coil 220 using the resonance. The AC current flows through the reception resonant coil 310 due to the received power. The power received in the reception resonant coil 310 is transmitted to the reception induction coil 320, which is inductively coupled with the reception resonant coil 310, due to the electromagnetic induction. The power received in the reception induction coil 320 is rectified by the rectifying unit 330 and transmitted to the load 400.

The transmission resonant coil 220 of the wireless power transmitter 200 may transmit power to the reception resonant coil 310 of the wireless power receiver 300 using a magnetic field. In detail, the transmission resonant coil 220 and the reception resonant coil 310 are resonance-coupled with each other so that the transmission resonant coil 220 and the reception resonant coil 310 operate at a resonance frequency.

The resonance-coupling between the transmission resonant coil 220 and the reception resonant coil 310 can significantly improve the power transmission efficiency between the wireless power transmitter 200 and the wireless power receiver 300.

A quality factor and a coupling coefficient are important in the wireless power transmission. In other words, the power transmission efficiency can be gradually improved as the values of the quality factor and the coupling coefficient are increased.

The quality factor may refer to an index of energy that may be stored in the vicinity of a wireless power transmitter or a wireless power receiver.

The quality factor may vary according to the operating frequency w as well as a shape, a dimension and a material of a coil. The quality factor may be expressed as following equation, $Q=w*L/R$. In the above equation, L refers to the inductance of a coil and R refers to resistance corresponding to the quantity of power loss caused in the coil.

The quality factor may have a value of 0 to infinity. The power transmission efficiency between the wireless power transmitter 200 and the wireless power receiver 300 can be improved as the value of the quality factor is increased.

The coupling coefficient represents the degree of inductive magnetic coupling between a transmission coil and a reception coil, and has a value of 0 to 1.

The coupling coefficient may vary according to the relative position and the distance between the transmission coil and the reception coil.

Figure 2:
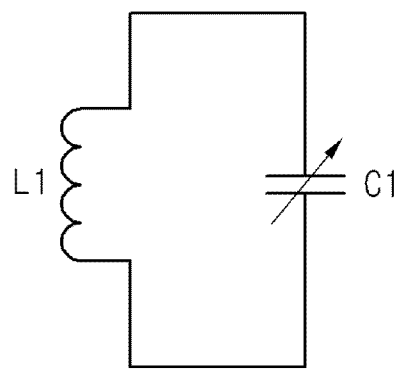
FIG. 2 is a circuit diagram showing an equivalent circuit of a transmission induction coil according to one embodiment.

FIG. 2 is a circuit diagram showing an equivalent circuit of the transmission induction coil 210 according to the one embodiment.

As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the capacitance of the capacitor C1. The equivalent circuit of the transmission resonant coil 220, the reception resonant coil 310 and the reception induction coil 320 may be the same as the equivalent circuit shown in FIG. 2.

Figure 3:
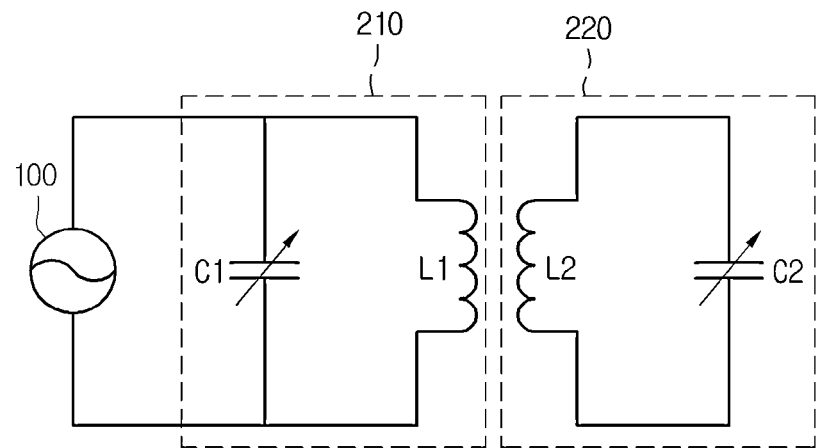
FIG. 3 is a circuit diagram showing an equivalent circuit of a power source and a transmitting unit according to one embodiment.

FIG. 3 is a circuit diagram showing an equivalent circuit of the power supply apparatus 100 and the wireless power transmitter 200 according to one embodiment.

As shown in FIG. 3, the transmission induction coil 210 and the transmission resonant coil 220 may be constructed by using inductors L1 and L2 and capacitors C1 and C2 having predetermined inductances and capacitances, respectively.

Figure 4:
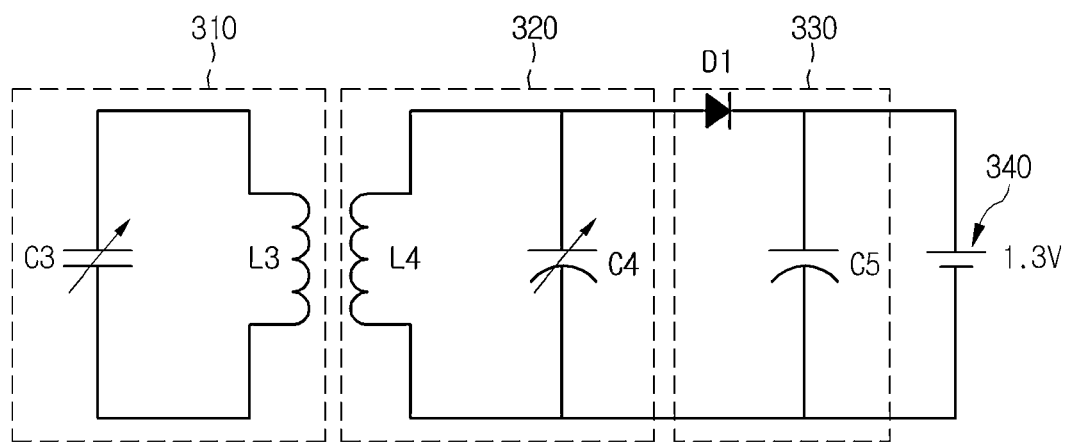
FIG. 4 is a is a circuit diagram showing an equivalent circuit of a reception resonant coil, a reception induction coil, a smoothing circuit and a load according to one embodiment.

FIG. 4 is a circuit diagram showing an equivalent circuit of the wireless power receiver 300 according to one embodiment.

As shown in FIG. 4, the reception resonant coil 310 and the reception induction coil 320 may be constructed by using inductors L3 and L4, and capacitors C3 and C4 having predetermined inductances and capacitances, respectively.

The rectifying unit 330 can transfer DC power to the load 400 by converting AC power received from the reception induction coil 320 into the DC power.

In detail, the rectifying unit 330 may include a rectifier and a smoothing circuit. According to one embodiment, the rectifier may include a silicon rectifier and may be equivalent as a diode D1 as shown in FIG. 4.

The rectifier can convert AC power received from the reception induction coil 320 into the DC power.

The smoothing circuit can output a smooth DC power by removing AC components included in the DC power converted by the rectifier. According to one embodiment, as shown in FIG. 4, the smoothing circuit may include a rectifying capacitor C5, but the embodiment is not limited thereto.

The load 400 may be a predetermined rechargeable battery or a device requiring the DC power. For example, the load 400 may refer to a battery.

The wireless power receiver 300 may be installed in an electronic device, such as a cellular phone, a laptop computer or a mouse, requiring the power.

The wireless power transmitter 200 may interchange information with the wireless power receiver 300 through in-band communication or an out-of-band communication.

The in-band communication refers to the communication for interchanging information between the wireless power transmitter 200 and the wireless power receiver 300 through a signal used in the wireless power transmission. The wireless power receiver 300 may further include a switch and may receive or may not receive power transmitted from the wireless power transmitter 200 through a switching operation of the switch. Accordingly, the wireless power transmitter 200 can recognize an on-signal or an off-signal of the switch included in the wireless power receiver 300 by detecting the quantity of power consumed in the wireless power transmitter 200.

In detail, the wireless power receiver 300 may change the power consumed in the wireless power transmitter 200 by adjusting the quantity of power absorbed in a resistor by using the resistor and the switch. The wireless power transmitter 200 may acquire the state information of the wireless power receiver 300 by detecting the variation of the power consumption. The switch may be connected to the resistor in series. According to one embodiment, the state information of the wireless power receiver 300 may include information about the present charge amount in the wireless power receiver 300 and the change of the charge amount.

In more detail, if the switch is open, the power absorbed in the resistor becomes zero, and the power consumed in the wireless power transmitter 200 is reduced.

If the switch is short-circuited, the power absorbed in the resistor becomes greater than zero, and the power consumed in the wireless power transmitter 200 is increased. If the wireless power receiver repeats the above operation, the wireless power transmitter 200 detects power consumed therein to make digital communication with the wireless power receiver 300.

The wireless power transmitter 200 receives the state information of the wireless power receiver 300 through the above operation so that the wireless power transmitter 200 can transmit appropriate power.

To the contrary, the wireless power transmitter 200 may include a resistor and a switch to transmit the state information of the wireless power transmitter 200 to the wireless power receiver 300.

According to one embodiment, the state information of the wireless power transmitter 200 may include information about the maximum amount of power to be supplied from the wireless power transmitter 200, the number of wireless power receivers 300 receiving the power from the wireless power transmitter 200 and the amount of available power of the wireless power transmitter 200.

Hereinafter, the out-of-band communication will be described.

The out-of-band communication refers to the communication performed through a specific frequency band other than the resonance frequency band in order to exchange information necessary for the power transmission. The wireless power transmitter 200 and the wireless power receiver 300 can be equipped with out-of-band communication modules to exchange information necessary for the power transmission. The out-of-band communication module may be installed in the power supply apparatus. In one embodiment, the out-of-band communication module may use a short-distance communication technology, such as Bluetooth, Zigbee, WLAN or NFC, but the embodiment is not limited thereto.

Hereinafter, a wireless power transmitter, a wireless power receiver, a wireless power transmission method, a wireless power reception method, an information transmission method and an information reception method according to another embodiment will be described with reference to FIGS. 5 to 8 as well as FIGS. 1 to 4.

Figure 5:
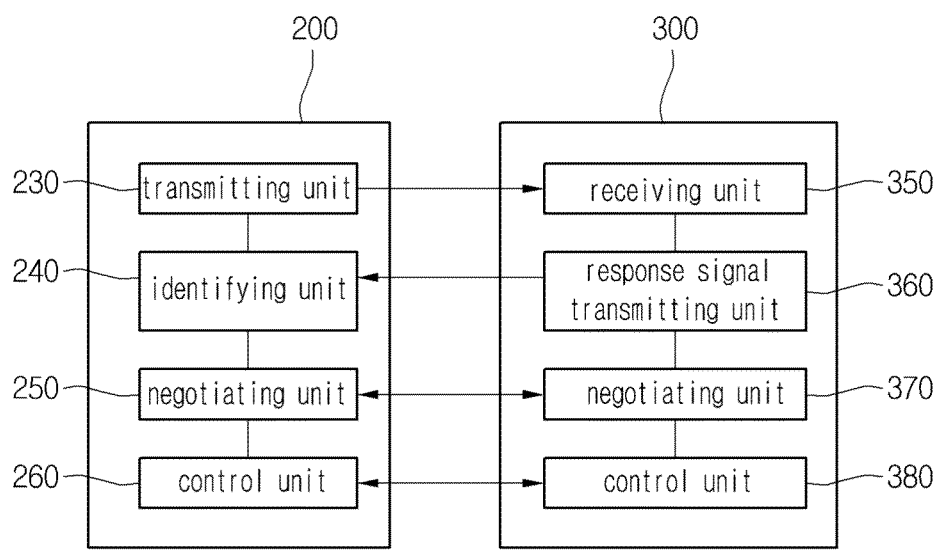
FIG. 5 is a block diagram showing a wireless power transmitter and a wireless power receiver according to another embodiment.

FIG. 5 is a block diagram showing the wireless power transmitter and the wireless power receiver according to another embodiment.

The wireless power transmitter 200 may include a transmitting unit 230, an identifying unit 240, a negotiating unit 250 and a control unit 260. In addition, the wireless power transmitter 200 may further include the transmission induction coil 210 and the transmission resonant coil 220 shown in FIG. 1.

The wireless power receiver 300 may include a receiving unit 350, a response signal transmitting unit 360, a negotiating unit 370 and a control unit 380. In addition, the wireless power receiver 300 may further include the reception resonant coil 310, the reception induction coil 320, the rectifier circuit 330 and the load 400 shown in FIG. 1.

The transmitting unit 230 transmits a connection signal to the receiving unit 350. According to one embodiment, the connection signal refers to a power signal for detecting and identifying the wireless power receiver 300. The transmitting unit 230 may periodically transmit the connection signal to detect the wireless power receiver 300.

The identifying unit 240 identifies the wireless power receiver 300 by receiving a response signal to the connection signal. If the identifying unit 240 does not receive the response signal to the connection signal, the transmission of the connection signal to the corresponding wireless power receiver 300 may be stopped. According to one embodiment, the identifying unit 240 may not receive the response signal when the connection signal is transmitted to a non-transmittable object, such as a key or a coin, other than a transmittable object.

As the response signal to the connection signal is received in the identifying unit 240, the negotiating unit 250 may negotiate the power transmission condition with the identified wireless power receiver 300. According to one embodiment, the power transmission condition may refer to the factors required for power transmission or power transmission stop between the wireless power transmitter 200 and the wireless power receiver 300. The power transmission may be achieved or not depending on the power transmission condition between the wireless power transmitter 200 and the wireless power receiver 300.

The control unit 260 controls the wireless power transmitter 200 such that the power can be transmitted to the identified wireless power receiver 300 according to the negotiated power transmission condition.

The negotiating unit 250 transmits state information of the wireless power transmitter 200 to the identified wireless power receiver 300 to allow the identified wireless power receiver 300 to determine specific state information based on the state information of the wireless power transmitter 200 and receives the specific state information from the identified wireless power receiver 300.

According to one embodiment, the state information of the wireless power transmitter 200 may include information about the maximum amount of power to be supplied from the wireless power transmitter 200, information about the number of wireless power receivers 300 receiving the power from the wireless power transmitter 200 and identification information of the wireless power transmitter 200.

According to one embodiment, the state information of the wireless power receiver 300 may include information about the present charge amount in the wireless power receiver 300 and the change of the charge amount.

The negotiating unit 250 receives the state information of the identified wireless power receiver 300 to determine specific state information based on the state information of the wireless power receiver 300 and the control unit 260 controls the wireless power transmitter 200 to transmit the power corresponding to the specific state information to the identified wireless power receiver 300.

According to one embodiment, the negotiating unit 250 transmits the information about the available amount of power to the identified wireless power receiver 300 to allow the identified wireless power receiver 300 to determine the demanded amount of power within the range of the available amount of power. After that, if the wireless power receiver 300 determines the demanded amount of power, the negotiating unit 250 receives the information about the demanded amount of power. The control unit 260 transmits power corresponding to the demanded amount of power to the wireless power receiver 300.

Through the above procedure, the power transmission state between the wireless power transmitter 200 and the wireless power receiver 300 can be detected, so that the active power transmission can be performed.

The wireless power receiver 300 may include the receiving unit 350, the response signal transmitting unit 360, the negotiating unit 370 and the control unit 380. In addition, the wireless power receiver 300 may further include the reception resonant coil 310, the reception induction coil 320, the rectifier circuit 330 and the load 400 shown in FIG. 1.

The receiving unit 350 may receive the connection signal from the wireless power transmitter 200.

The wireless power receiver 300 can transmit the response signal to the received connection signal to the wireless power transmitter 200.

The negotiating unit 370 can negotiate the power transmission condition with the wireless power transmitter 200 and the wireless power receiver 300 can receive the power from the wireless power transmitter 200 based on the negotiation result.

According to one embodiment, the negotiating unit 370 receives the state information of the wireless power transmitter 200 to determine specific state information based on the state information of the wireless power transmitter 200 and can transmit the determined specific state information to the wireless power transmitter 200. In addition, the wireless power receiver 300 can receive the power corresponding to the specific state information from the wireless power transmitter 200.

Through the above procedure, the power transmission state between the wireless power transmitter 200 and the wireless power receiver 300 can be detected, so that the active power transmission can be performed.

Figure 6:
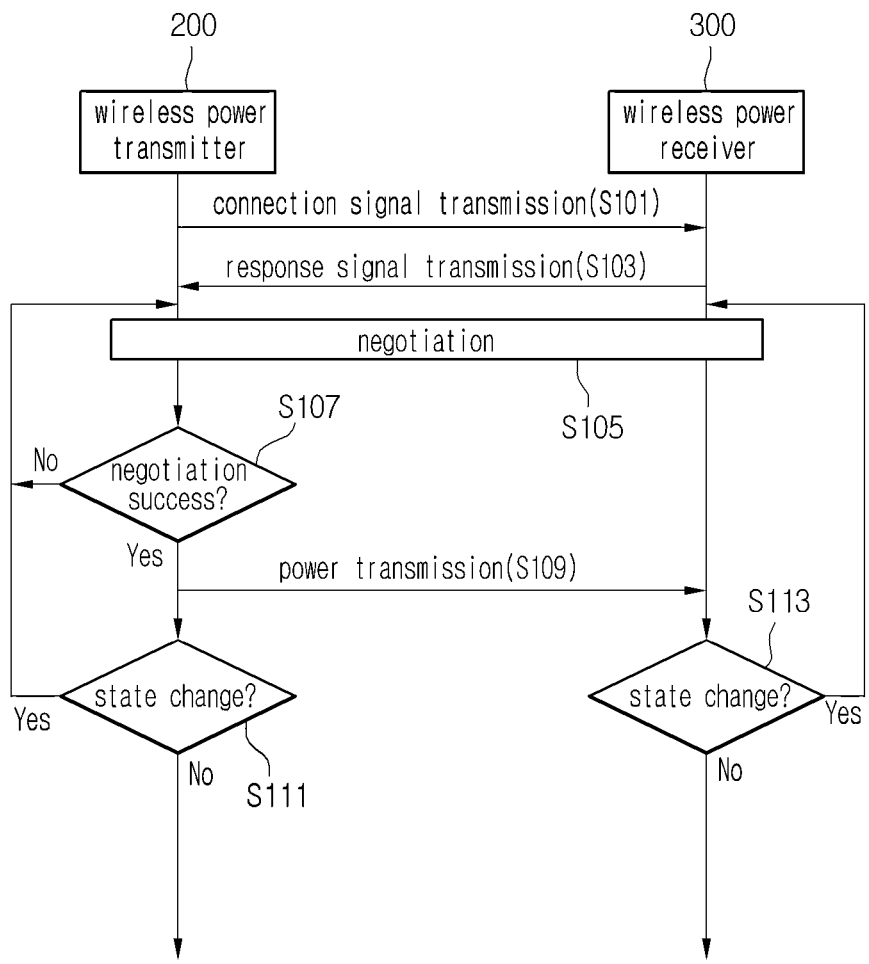
FIG. 6 is a flowchart showing a wireless power transmission method according to one embodiment.

FIG. 6 is a flowchart showing a wireless power transmission method according to one embodiment.

Although a wireless power transmission using resonance is described below as an example of the wireless power transmission method according to one embodiment, a wireless power transmission using an electromagnetic induction is also possible.

According to one embodiment, a bidirectional communication can be implemented through the configuration for changing the amount of current in the wireless power transmitter 200 and the wireless power receiver 300. For instance, the bidirectional communication can be implemented through the in-band communication using a variable resistor and a switch or the out-of-band communication. The in-band communication and the out-of-band communication are the same as those described with reference to FIG. 1.

Referring to FIG. 6, the wireless power transmitter 200 transmits the connection signal to the wireless power receiver 300 (S101). According to one embodiment, the connection signal refers to a power signal for detecting and identifying the wireless power receiver 300. The wireless power transmitter 200 may periodically transmit the connection signal to detect the wireless power receiver 300.

Upon receiving the connection signal, the wireless power receiver 300 transmits the response signal to the wireless power transmitter 200 (S103). After that, the wireless power transmitter 200 receives the response signal to the connection signal to identify the wireless power receiver 300.

If the wireless power transmitter 200 does not receive the response signal to the connection signal, the transmission of the connection signal to the corresponding wireless power receiver 300 may be stopped. According to one embodiment, the wireless power transmitter 200 may not receive the response signal when the connection signal is transmitted to a non-transmittable object, such as a key or a coin, other than a transmittable object.

If the wireless power transmitter 200 identifies the wireless power receiver 300, the wireless power transmitter 200 negotiates the power transmission condition with the identified wireless power receiver 300 (S105).

If the negotiation between the wireless power transmitter 200 and the wireless power receiver 300 is succeeded (S107), the wireless power transmitter 200 transmits the power to the wireless power receiver 300 based on the negotiated power transmission condition (S109).

Step (S105) of negotiating the power transmission to the identified wireless power receiver 300 may include a step of transmitting the state information of the wireless power transmitter 200 to the identified wireless power receiver 300 to allow the identified wireless power receiver 300 to determine the specific state information based on the state information of the wireless power transmitter 200 and a step of receiving the specific state information from the identified wireless power receiver 300.

According to one embodiment, steps 105 to 109 may include the following process. The wireless power transmitter 200 transmits the information about the available amount of power to the identified wireless power receiver 300 to allow the identified wireless power receiver 300 to determine the demanded amount of power within the range of the available amount of power. After that, if the wireless power receiver 300 determines the demanded amount of power, the wireless power transmitter 200 receives the information about the demanded amount of power. Then, the wireless power transmitter 200 transmits the power corresponding to the demanded amount of power to the identified wireless power receiver 300.

According to one embodiment, steps 105 to 109 may include the following process. As an example, the wireless power transmitter 200 is assumed as it wirelessly transmits the power to a plurality of wireless power receivers 300.

Information about the priority of power transmission to the wireless power receivers 300 is transmitted from the wireless power transmitter 200 to the identified wireless power receiver 300 to allow the identified wireless power receiver 300 to determine whether it accepts the priority determined based on the information about the priority. Then, if the identified wireless power receiver 300 accepts the determined priority, the wireless power transmitter 200 transmits the power based on the priority.

According to one embodiment, steps 105 to 109 may include the following process. As an example, it is assumed that a plurality of wireless power transmitters 200 are present. Each wireless power transmitter 200 transmits the identification information of each wireless power transmitter 200 to the identified wireless power receiver 300 to allow the identified wireless power receiver 300 to determine one of the wireless power transmitters 200. Then, if the identified wireless power receiver 300 selects a specific wireless power transmitters 200, the selected wireless power transmitters 200 receives a selection request signal from the identified wireless power receiver 300 and transmits the power to the identified wireless power receiver 300.

According to one embodiment, in the negotiation step, the wireless power transmitter 200 requests the state information of the wireless power receiver 300 and the state information of the wireless power receiver 300 is transmitted to the wireless power transmitter 200 in response to the request. In contrast, in the negotiation step, the wireless power receiver 300 may request the state information of the wireless power transmitter 200 and the state information of the wireless power transmitter 200 may be transmitted to the wireless power receiver 300 in response to the request.

According to one embodiment, in the negotiation step, the power transmission is determined based on the state information of the wireless power transmitter 200 and the wireless power receiver 300.

According to one embodiment, the state information of the wireless power transmitter 200 may refer to information about the number of the wireless power receivers 300 that receive the power from one wireless power transmitter 200.

According to one embodiment, if the identification number is given for each wireless power receiver 300, the state information of the wireless power transmitter 200 may refer to information about the given identification numbers of the wireless power receivers 300 that receive the power from a specific wireless power transmitter 200.

According to one embodiment, the state information of the wireless power transmitter 200 may refer to information about the amount of power supplied to the wireless power receiver 300.

According to one embodiment, when the power is transmitted to a plurality of wireless power receivers 300, the state information of the wireless power transmitter 200 may refer to information about the priority of power transmission to the wireless power receivers 300.

According to one embodiment, when the power is transmitted to a plurality of wireless power receivers 300, the state information of the wireless power transmitter 200 may refer to information about the differential ratio of the power transmission to the wireless power receivers 300. For instance, when a specific wireless power transmitter 200 transmits the power to three wireless power receivers 300, the specific wireless power transmitter 200 may transmit the power to the three wireless power receivers 300 at the differential ratio of 50%, 30% and 20%, respectively.

According to one embodiment, the state information of the wireless power receiver 300 may refer to information about the present charge amount or the change of the charge amount in the wireless power receiver 300.

According to one embodiment, the state information of the wireless power receiver 300 may refer to information about the wireless power transmitter 200 that transmits the power to the wireless power receiver 300. That is, the state information of the wireless power receiver 300 may signify the identification information of the wireless power receiver 300 that receives the power.

If the negotiation between the wireless power transmitter 200 and the wireless power receiver 300 is succeeded (S107), the wireless power transmitter 200 transmits the power to the identified wireless power receiver 300 based on the negotiated power transmission condition (S109).

If the state of the wireless power transmitter 200 is changed during the power transmission process (S111), the process returns to negotiation step S105 or the power transmission is stopped.

According to one embodiment, the change of the state of the wireless power transmitter 200 may refer to information about the change of the amount of power to be supplied from the wireless power transmitter 200. In this case, if the amount of power to be supplied from the wireless power transmitter 200 is reduced due to the external factors, the wireless power transmitter 200 stops the power transmission and the process enters negotiation step S105 to perform the negotiation for adjusting the amount of power transmission between the wireless power transmitter 200 and the wireless power receiver 300. Then, if the negotiation for adjusting the amount of power transmission is succeeded, the power transmission is performed. Otherwise, the process again enters negotiation step S105. If the power supplied to the wireless power transmitter 200 is shut off or the wireless power receiver 300 has been charged, the power transmission is finished.

According to one embodiment, the change of the state of the wireless power transmitter 200 may refer to information about the change of the number of wireless power receivers 300 receiving the power from the wireless power transmitter 200.

If the state of the wireless power receiver 300 is changed during the power transmission process (S113), the process returns to negotiation step S105 or the power transmission is stopped.

According to one embodiment, the change of the state of the wireless power receiver 300 may signify the detection of a new wireless power receiver 300 besides the wireless power receiver 300 that receives the power from the wireless power transmitter 200.

Figure 7:
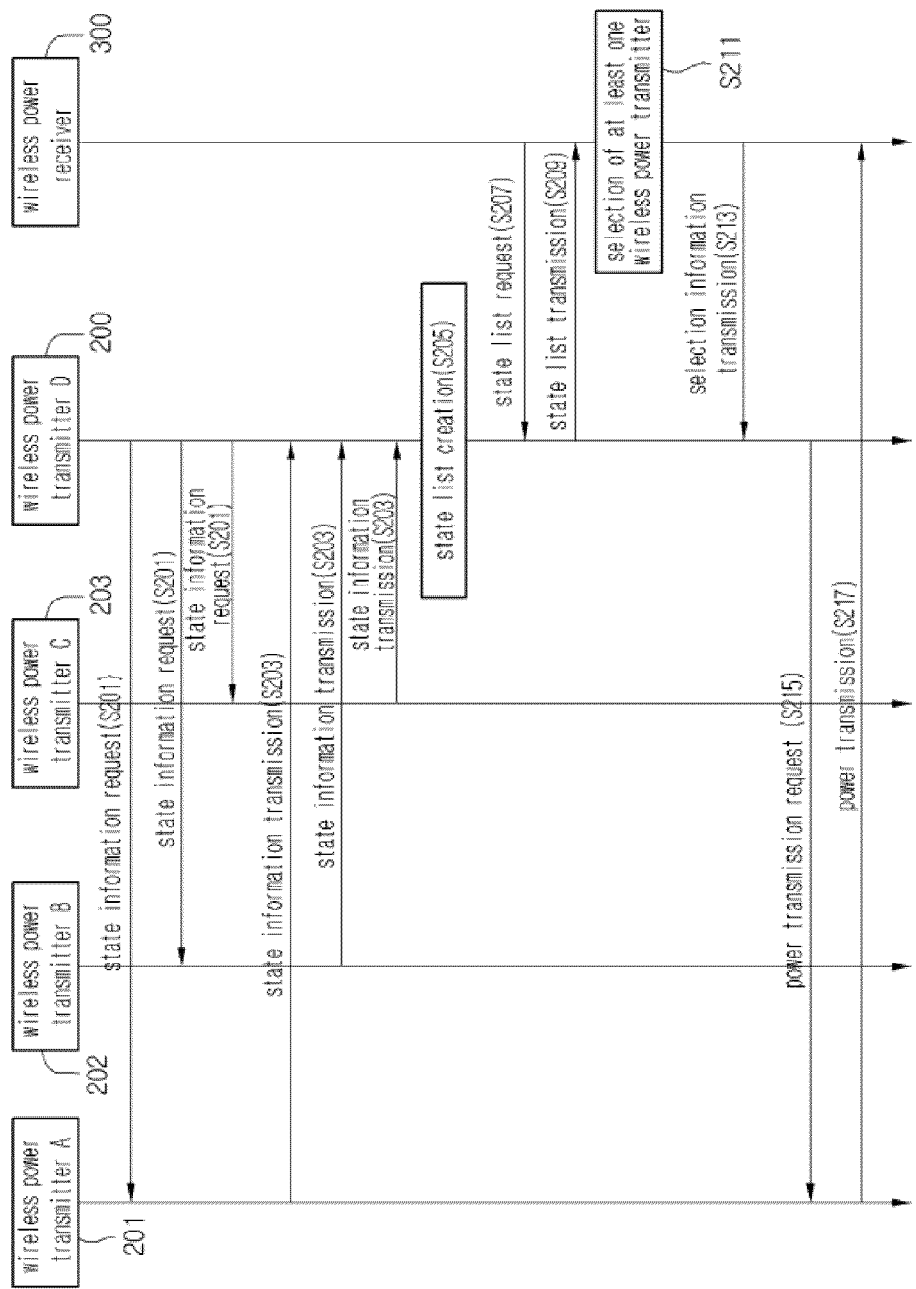
FIG. 7 is a ladder diagram for explaining a wireless power transmission method according to another embodiment.

FIG. 7 is a ladder diagram for explaining a wireless power transmission method according to another embodiment.

Referring to FIG. 7, the wireless power transmitter 200 requests the state information to each of wireless power transmitters 201, 202 and 203 (S201). Although only three wireless power transmitters 201, 202 and 203 are illustrated in FIG. 7, the embodiment is not limited thereto. In addition, each of the wireless power transmitters 201, 202 and 203 may include the configuration of the wireless power transmitter 200 described with reference to FIG. 5. The state information of the wireless power transmitter 200 may include information about the maximum amount of power to be supplied from the wireless power transmitter 200, the number of wireless power receivers 300 receiving the power from the wireless power transmitter 200 and the amount of available power of the wireless power transmitter 200, but the embodiment is not limited thereto.

According to one embodiment, the wireless power transmitter 200 may transceive information to/from other wireless power transmitters 201, 202 and 203 through the in-band communication or the out-of-band communication.

Then, the wireless power transmitter 200 receives the state information of the wireless power transmitters 201, 202 and 203, respectively, in response to the request for the state information (S203).

In addition, the wireless power transmitter 200 creates the state list based on the received state information of the wireless power transmitters 201, 202 and 203 (S205). According to one embodiment, the state list may be created by collecting the state information of the wireless power transmitters 201, 202 and 203. The state list will be described in more detail with reference to table 1.

TABLE 1

| Wireless power transmitter (ID symbol) | State information of wireless power transmitter | | |
|---|---|---|---|
| | Maximum amount of power to be supplied | Number of wireless power receivers | Available amount of power |
| Wireless power transmitter A | 100 W | 4 | 20 W |
| Wireless power transmitter B | 200 W | 5 | 15 W |
| Wireless power transmitter C | 300 W | 6 | 30 W |

Table 1 is an example of the state list created by the wireless power transmitter 200 based on the state information received from three wireless power transmitters A, B and C. In addition, although not shown in the drawing, the wireless power transmitter 200 may create the state list by adding the state information of the wireless power transmitter 200 to the state list.

Referring to table 1, the maximum amount of power to be supplied from the wireless power transmitter A is 100 W, and the wireless power transmitter A supplies the power to four wireless power receivers 300. In addition, the available amount of power in the wireless power transmitter A is 20 W. The available amount of power refers to the amount of power to be supplied to another wireless power receiver 300 except for the four wireless power receivers 300. In addition, the demanded amount of power of the four wireless power receivers 300 may not be needed to be constant, but may vary.

The available amount of power in the wireless power transmitter may vary depending on the wireless power transmitters 201, 202 and 203.

The maximum amount of power of the wireless power transmitter B is 200 W and the wireless power transmitter B supplies the power to five wireless power receivers 300. In addition, the available amount of power in the wireless power transmitter B is 15 W. Further, the demanded amount of power of the five wireless power receivers 300 may not be needed to be constant, but may vary.

The maximum amount of power of the wireless power transmitter C is 300 W and the wireless power transmitter C supplies the power to six wireless power receivers 300. In addition, the available amount of power in the wireless power transmitter C is 30 W. Further, the demanded amount of power of the six wireless power receivers 300 may not be needed to be constant, but may vary.

After that, the wireless power transmitter 200 receives the request for transmission of the state list from the wireless power receiver 300 (S207). According to one embodiment, the wireless power transmitter 200 and the wireless power receiver 300 may transceive information through the in-band communication or the out-of-band communication.

Then, the wireless power transmitter 200 transmits the state list to the wireless power receiver 300 in response to the request for the transmission of the state list (S209).

Thereafter, the wireless power receiver 300 selects at least one of the wireless power transmitters 201, 202 and 203 based on the received state list to receive the power (S211). That is, the wireless power receiver 300 may select at least one of the wireless power transmitters 201, 202 and 203 based on the state information of each wireless power transmitter, that is, the maximum of the power to be supplied, the number of the wireless power receivers that receive the power from each wireless power transmitter and the available amount of power in each wireless power transmitter.

According to one embodiment, the wireless power receiver 300 may select the wireless power transmitter 203 having the highest available amount of power from among the wireless power transmitters 201, 202 and 203. Such a selection signifies that the wireless power receiver 300 requires the power of 25 W so the wireless power receiver 300 selects the wireless power transmitter capable of supplying the power of 25 W. However, the embodiment is not limited to the above and the wireless power receiver 300 may select two wireless power transmitters 201 and 203.

According to one embodiment, the wireless power receiver 300 may select the wireless power transmitter A, which transmits the power to the wireless power receivers 300 of the fewest number, from among the wireless power transmitters 201, 202 and 203.

In this manner, the wireless power receiver 300 can select the wireless power transmitter suitable for the power transmission based on the state list.

After that, the wireless power receiver 300 transmits information about the selection of at least one wireless power transmitter to the wireless power transmitter 200 (S213). The selection information may include information about the wireless power transmitter selected by the wireless power receiver 300 from among the wireless power transmitters 201, 202 and 203. In detail, if the wireless power transmitters 201, 202 and 203 have identification symbols A, B and C, respectively, the selection information may include information about the identification symbols.

The wireless power transmitter 200 requests the power transmission to the wireless power transmitter 201 selected based on the received selection information (S215). In FIG. 7, the wireless power transmitter 200 requests the power transmission to the wireless power transmitter 201, but the embodiment is not limited thereto.

The selected wireless power transmitter 201 transmits the power to the wireless power receiver 300 (S217). According to one embodiment, the selected wireless power transmitter 201 may wirelessly transmit the power to the wireless power receiver 300 using electromagnetic induction or resonance.

In this manner, according to the embodiment, the wireless power transmitter 200 and the wireless power receiver 300 may share the information through the bidirectional communication, so that the active power transmission can be achieved based on the power condition. Thus, the power transmission can be effectively performed between the wireless power transmitter 200 and the wireless power receiver 300.

Figure 8:
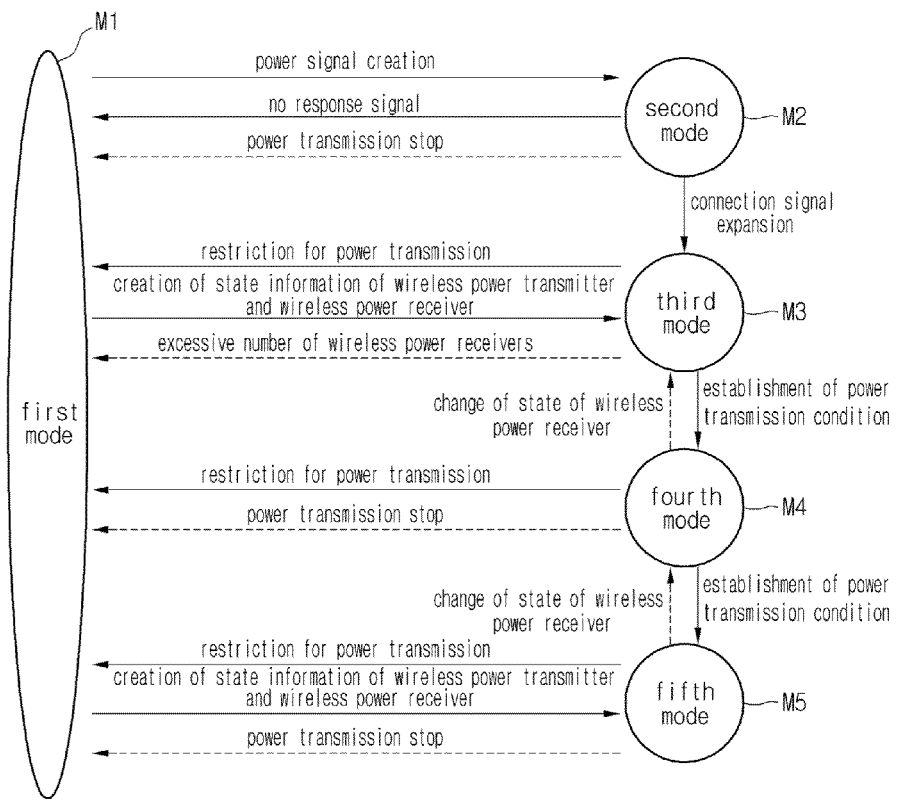
FIG. 8 is a state transition diagram for wireless power transmission according to one embodiment.

FIG. 8 is a state transition diagram for wireless power transmission according to one embodiment.

Hereinafter, the state transition diagram for the wireless power transmission according to one embodiment will be described with reference to FIGS. 1 to 7.

—First Mode (Selection Mode)

At first, the wireless power transmission system including the wireless power transmitter 200 and the wireless power receiver 300 is in a first mode M1. According to one embodiment, the first mode M1 may be the selection mode. In the first mode, the wireless power transmitter 200 may manage an interface region for removal and arrangement of objects.

If the wireless power transmitter 200 detects at least one object, the wireless power transmitter 200 must try to detect the position of the at least one object. In particular, the wireless power transmitter 200 may try to distinguish the wireless power receiver 300 capable of receiving the power from other foreign objects (for instance, key or coin).

In addition, the wireless power transmitter 200 must try to select the wireless power receiver 300 for power transmission. If the wireless power transmitter 200 has no sufficient information for accomplishing the above purposes at the early stage, the wireless power transmitter 200 sequentially and repeatedly performs the connection mode and the identification and setting mode, which will be described later, and then performs the selection mode.

—Second Mode (Connection Mode)

According to one embodiment, the second mode M2 may be the connection mode. In the second mode M2, the wireless power transmitter 200 may have been ready to make communication with the wireless power receiver 300.

If the wireless power transmitter 200 detects the wireless power receiver 300 in the first mode M1, the wireless power transmission system is transited to the second mode M2 to transmit the power to the wireless power receiver 300. That is, if the existence of the wireless power receiver 300 is recognized, the wireless power transmission system is transited to the second mode M2 to transmit the connection signal to the wireless power receiver 300. The connection signal is transmitted from the wireless power transmitter 200 to the wireless power receiver 300 to receive the state information of the wireless power receiver 300.

If the wireless power transmitter 200 does not receive the response signal to the connection signal from the wireless power receiver 300, the transmission of the connection signal is stopped and the wireless power transmission system is transited to the first mode M1. If the wireless power transmitter 200 receives the response signal, which represents that the load (or battery) 400 has been sufficiently charged, from the wireless power receiver 300, the wireless power transmitter 200 finishes the power transmission.

If the wireless power transmitter 200 receives the response signal requesting the power transmission from the wireless power receiver 300 in the second mode M2, the wireless power transmitter 200 may transmit an additional connection signal to a new wireless power receiver 300. The additional connection signal signifies a signal for detecting the new wireless power receiver 300.

If there is no response signal to the additional connection signal of the wireless power transmitter 200, the operation for detecting the new wireless power receiver 300 is stopped.

—Third Mode (Identification and Setting Mode)

If the wireless power transmitter 200 has received the response signal to the connection signal from the wireless power receiver 300 in the second mode M2, the wireless power transmission system is transited to the third mode M3 for collecting identification information and state information of the wireless power receiver 300. According to one embodiment, the third mode M3 may be the identification and setting mode. The identification information of the wireless power receiver 300 may refer to the sort, type or model of the wireless power receiver 300, but the embodiment is not limited thereto. The state information of the wireless power receiver 300 may signify the maximum amount of power (or maximum amount of charge) to be supplied to the load (or battery) 400 and the present amount of power remaining in the load (or battery) 400, but the embodiment is not limited thereto. The wireless power transmitter 200 uses the identification information and state information of the wireless power receiver 300 to establish the power transmission condition with respect to the wireless power receiver 300. The power transmission condition may refer to the group of conditions for specifying the power transmission from the wireless power transmitter 200 to the wireless power receiver 300.

If there is restriction for the power transmission condition in the third mode M3, the wireless power transmission system is transited to the first mode M1. According to one embodiment, the restriction for the power transmission condition may refer to the non-establishment of the power transmission condition. According to one embodiment, the restriction for the power transmission condition may signify a case in which an unexpected data packet is transmitted between the wireless power transmitter 200 and the wireless power receiver 300. According to one embodiment, the restriction for the power transmission condition may refer to a situation, such as a time out. The time out may include a case in which the power transmission is stopped after a predetermined time has elapsed from the removal of the wireless power receiver 300 that receives the power.

If the wireless power transmission system is transited to the first mode M1 due to the restriction for the power transmission condition in the third mode M3, the wireless power transmitter 200 transmits the state information related to the wireless power transmitter 200 to the wireless power receiver 300 and then the wireless power transmission system is transited again to the third mode M3. According to one embodiment, the state information of the wireless power transmitter 200 may refer to information about the number of wireless power receivers 300 that receive the power from one wireless power transmitter 200.

According to one embodiment, if the identification number is dedicated for each wireless power receiver 300, the state information of the wireless power transmitter 200 may refer to information about the dedicated identification numbers of the wireless power receivers 300 that receive the power from a specific wireless power transmitter 200.

According to one embodiment, the state information of the wireless power transmitter 200 may refer to information about the amount of power supplied to the wireless power receiver 300.

According to one embodiment, when the power is transmitted to a plurality of wireless power receivers 300, the state information of the wireless power transmitter 200 may refer to information about the priority of power transmission to the wireless power receivers 300.

According to one embodiment, when the power is transmitted to a plurality of wireless power receivers 300, the state information of the wireless power transmitter 200 may refer to information about the differential ratio of the power transmission to the wireless power receivers 300. For instance, when a specific wireless power transmitter 200 transmits the power to three wireless power receivers 300, the specific wireless power transmitter 200 may transmit the power to the three wireless power receivers 300 at the differential ratio of 50%, 30% and 20%, respectively.

In the number of the wireless power receivers 300 exceeds a certain number in the third mode M3, the wireless power transmission system is transited again to the first mode M1. That is, when the specific wireless power transmitter 200 supplies the power to five wireless power receivers 300, if a new wireless power receiver 300 is detected, the wireless power transmission system is transited to the first mode M1 such that the power cannot be transmitted to the new wireless power receiver 300.

—Fourth Mode (Power Transmission)

If the power transmission condition is established in the third mode M3, the wireless power transmission system may be transited to the fourth mode M4. According to one embodiment, the fourth mode M4 refers to the state in which the wireless power transmitter 200 supplies the power to the wireless power receiver 300. According to one embodiment, the fourth mode M4 refers to the state in which the wireless power transmitter 200 supplies the power to the wireless power receiver 300 while adjusting the current flowing through a coil in response to information received from the wireless power receiver 300.

If one of the power transmission conditions is not established in the fourth mode M4, the power transmission from the wireless power transmitter 200 to the wireless power receiver 300 is stopped and the wireless power transmission system is transited to the first mode M1. According to one embodiment, the restriction for the power transmission condition may refer to the non-establishment of the power transmission condition. According to one embodiment, the restriction for the power transmission condition may signify a case in which an unexpected data packet is transmitted between the wireless power transmitter 200 and the wireless power receiver 300. According to one embodiment, the restriction for the power transmission condition may refer to a situation, such as a time out. The time out may include a case in which the power transmission is stopped after a predetermined time has elapsed from the removal of the wireless power receiver 300 that receives the power.

If the wireless power transmitter 200 receives the response signal, which represents that the load (or battery) 400 has been sufficiently charged, from the wireless power receiver 300 in the fourth mode M4, the wireless power transmitter 200 finishes the power transmission and the wireless power transmission system is transited to the first mode M1.

If the state of the wireless power receiver 300 is changed in the fourth mode M4, the wireless power transmission system may be transited to the third mode M3.

According to one embodiment, the change of the state of the wireless power receiver 300 may signify the detection of a new wireless power receiver 300 during the power transmission from the wireless power transmitter 200 to the wireless power receiver 300. In this case, the wireless power transmission system is transited from the fourth mode M4 to the third mode M3. After that, the wireless power transmitter 200 works to collect the identification information and state information of the wireless power receiver 300 and the wireless power transmission system is transited to the fourth mode M4 if the wireless power transmission condition has been established. In addition, the wireless power transmission system is transited to the first mode M1 if there is restriction for the wireless power transmission condition.

According to one embodiment, the change of the state of the wireless power receiver 300 may refer to the detection of at least one new wireless power receiver 300 due to the excessive number of the wireless power receivers 300 that receive the power from the wireless power transmitter 200. In this case, the wireless power transmission system is transited from the fourth mode M4 to the third mode M3. Then, the wireless power transmitter 200 works to collect the identification information and state information of the wireless power receiver 300 and the wireless power transmission system is transited to the first mode M1 with respect to the excessive wireless power receivers 300.

—Fifth Mode (Power Transmission and Bidirectional Communication)

The wireless power transmission system may be transited from the fourth mode M4 to the fifth mode M5 to allow the wireless power transmitter 200 and the wireless power receiver 300 to share information.

According to one embodiment, the fifth mode M5 may be a power transmission and bidirectional communication mode. According to one embodiment, the power transmission is performed between the wireless power transmitter 200 and the wireless power receiver 300 and the wireless power transmitter 200 and the wireless power receiver 300 may share the information about the change of the state thereof in the fifth mode M5.

According to one embodiment, the information about the change of the state of the wireless power transmitter 200 may refer to information about the change of the number of wireless power transmitters 200 and the change of the amount of power to be supplied from the wireless power transmitter 200.

According to one embodiment, the information about the change of the state of the wireless power transmitter 200 may refer to information about the change of the number of wireless power receivers 300 that receive the power from one wireless power transmitter 200.

According to one embodiment, if the identification number is dedicated for each wireless power receiver 300, the information about the change of the state of the wireless power transmitter 200 may refer to information about the dedicated identification numbers of the wireless power receivers 300 that receive the power from a specific wireless power transmitter 200.

According to one embodiment, the information about the change of the state of the wireless power transmitter 200 may refer to information about the amount of power supplied to the wireless power receiver 300.

According to one embodiment, when the power is transmitted to a plurality of wireless power receivers 300, the information about the change of the state of the wireless power transmitter 200 may refer to information about the priority of power transmission to the wireless power receivers 300.

According to one embodiment, when the power is transmitted to a plurality of wireless power receivers 300, the information about the change of the state of the wireless power transmitter 200 may refer to information about the differential ratio of the power transmission to the wireless power receivers 300. For instance, when a specific wireless power transmitter 200 transmits the power to three wireless power receivers 300, the specific wireless power transmitter 200 may transmit the power to the three wireless power receivers 300 at the differential ratio of 50%, 30% and 20%, respectively.

If there is restriction for the power transmission condition in the fifth mode M5, the wireless power transmission system is transited to the first mode M1. According to one embodiment, the restriction for the power transmission condition may refer to the non-establishment of the power transmission condition. According to one embodiment, the restriction for the power transmission condition may signify a case in which an unexpected data packet is transmitted between the wireless power transmitter 200 and the wireless power receiver 300. According to one embodiment, the restriction for the power transmission condition may refer to a situation, such as a time out. The time out may include a case in which the power transmission is stopped after a predetermined time has elapsed from the removal of the wireless power receiver 300 that receives the power.

If the wireless power transmission system is transited to the first mode Ml due to the restriction for the power transmission condition in the fifth mode M5, the wireless power transmitter 200 transmits the state information related to the wireless power receivers 300 to the wireless power receiver 300 and then the wireless power transmission system is transited again to the fifth mode M3.

If the wireless power transmitter 200 receives the response signal, which represents that the load (or battery) 400 has been sufficiently charged, from the wireless power receiver 300 in the fifth mode M5, the wireless power transmitter 200 finishes the power transmission and the wireless power transmissions system is transited to the first mode M1.

If the state of the wireless power receiver 300 is changed in the fifth mode M5, the wireless power transmission system may be transited to the fourth mode M4.

According to one embodiment, the change of the state of the wireless power receiver 300 may signify the detection of a new wireless power receiver 300 during the power transmission from the wireless power transmitter 200 to the wireless power receiver 300 through the bidirectional communication.

In this case, the wireless power transmission system is transited from the fifth mode M5 to the fourth mode M4. After that, the wireless power transmitter 200 works to collect the identification information and state information of a new wireless power receiver 300 and the wireless power transmission system is transited again to the fifth mode M4 if the wireless power transmission condition has been established. In addition, the wireless power transmission system is transited to the first mode M1 if there is restriction for the wireless power transmission condition.

Although the embodiment has been described with reference to the wireless power transmission using the resonance, the wireless power transmission method, the wireless power reception method and the power control method using the bidirectional communication according to the embodiment may be applicable for other wireless power transmissions using the electromagnetic induction or the RF scheme.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power transmission method of a wireless power transmitter using a resonance coil via a resonance frequency band for transmitting power to a plurality of wireless power receivers, the wireless power transmission method comprising:

detecting a first wireless power receiver during transmitting the power to a second wireless power receiver via the resonance frequency band;

transmitting state information of the wireless power transmitter to the second wireless power receiver via a specific frequency band, wherein the state information of the wireless power transmitter includes an available amount of power of the power transmission for the second wireless power receiver;

receiving specific state information from the second wireless power receiver via the specific frequency band, wherein the specific state information comprises a demanded amount of power of the second wireless power receiver, and wherein the demanded amount of power is adjusted by the second wireless power receiver within the available amount of power of the wireless power transmitter; and transmitting the power adjusted based on the specific state information to the first wireless power receiver and the second wireless power receiver via the resonance frequency band being a resonance-coupled frequency between the wireless power transmitter and the first wireless power receiver and being different from the specific frequency band.

2. The wireless power transmission method of claim 1, wherein the detecting of the first wireless power receiver comprises:

transmitting a connection signal for identifying the first wireless power receiver; and identifying the first wireless power receiver by receiving a response signal corresponding to the connection signal from the first wireless power receiver.

3. The wireless power transmission method of claim 1, wherein the state information of the wireless power transmitter includes a dedicated identification number given for the second wireless power receiver.

4. The wireless power transmission method of claim 1, further comprising:

checking if an available amount of power of the wireless power transmitter for the first wireless power receiver is changed; and transmitting the state information of the wireless power transmitter to the first wireless power receiver via the specific frequency band, wherein the state information of the wireless power transmitter includes the changed available amount of power of the power transmission for the first wireless power receiver.

5. The wireless power transmission method of claim 4, wherein the available amount of power of the power transmission for the second wireless power receiver and the changed available amount of power of the power transmission for the first wireless power receiver have a different ratio of the power transmission for the first wireless power receiver and the second wireless power receiver.

6. A wireless power transmitter using a resonance coil via a resonance frequency band for transmitting power to a plurality of wireless power receivers, the wireless power transmitter comprising:

an identifying unit configured to detect a first wireless power receiver during transmitting the power to a second wireless power receiver via the resonance frequency band;

a negotiation unit configured to transmit state information of the wireless power transmitter to the second wireless power receiver via a specific frequency band, and receive specific state information from the second wireless power receiver via the specific frequency band, wherein the state information of the wireless power transmitter includes an available amount of power of the power transmission for the second wireless power receiver, wherein the specific state information comprises a demanded amount of power of the second wireless power receiver, and wherein the demanded amount of power is adjusted by the second wireless power receiver within the available amount of power of the wireless power transmitter; and a transmitting unit configured to transmit the power adjusted based on the specific state information to the first wireless power receiver and the second wireless power receiver via the resonance frequency band being a resonance-coupled frequency between the wireless power transmitter and the first wireless power receiver and being different from the specific frequency band.

7. The wireless power transmitter of claim 6, wherein the state information of the wireless power transmitter includes a dedicated identification number given for the second wireless power receiver.

8. The wireless power transmitter of claim 6, wherein the negotiation unit is further configured to:

check if an available amount of power of the wireless power transmitter for the first wireless power receiver is changed, and transmit the state information of the wireless power transmitter to the first wireless power receiver via the specific frequency band, and wherein the state information of the wireless power transmitter includes the changed available amount of power of the power transmission for the first wireless power receiver.

9. The wireless power transmitter of claim 8, wherein the available amount of power of the power transmission for the second wireless power receiver and the changed available amount of power of the power transmission for the first wireless power receiver have a different ratio of the power transmission for the first wireless power receiver and the second wireless power receiver.

* * * * *